United States Patent
Fujii et al.

(10) Patent No.: US 9,041,804 B2
(45) Date of Patent: May 26, 2015

(54) INPUT DEVICE, VEHICLE ENVIRONMENT MONITORING APPARATUS, ICON SWITCH SELECTION METHOD, AND RECORDING MEDIUM

(75) Inventors: Taketoshi Fujii, Anjo (JP); Haruka Iga, Chiryu (JP); Yoji Inui, Aichi-ken (JP); Atsuo Fukaya, Kariya (JP); Keiichi Nakamura, Toyota (JP); Yoshiyuki Yamada, Kariya (JP)

(73) Assignees: AISIN SEIKI KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 480 days.

(21) Appl. No.: 13/130,982

(22) PCT Filed: Nov. 20, 2009

(86) PCT No.: PCT/JP2009/069729
§ 371 (c)(1),
(2), (4) Date: Jul. 7, 2011

(87) PCT Pub. No.: WO2010/061797
PCT Pub. Date: Jun. 3, 2010

(65) Prior Publication Data
US 2011/0261201 A1  Oct. 27, 2011

(30) Foreign Application Priority Data
Nov. 25, 2008 (JP) .................. 2008-300197

(51) Int. Cl.
*G06F 3/048* (2013.01)
*G01C 21/36* (2006.01)
(Continued)

(52) U.S. Cl.
CPC .............. *G01C 21/3664* (2013.01); *B60R 1/00* (2013.01); *B60R 25/00* (2013.01); *B60R 2300/105* (2013.01); *G06F 3/04817* (2013.01); *G06F 2203/014* (2013.01)

(58) Field of Classification Search
CPC ......................................................... B60R 1/00
USPC ......................................................... 348/148
See application file for complete search history.

(56) References Cited

U.S. PATENT DOCUMENTS 5,990,893 A * 11/1999 Numazaki ..................... 715/863
6,426,761 B1 * 7/2002 Kanevsky et al. ............. 715/788
(Continued)

FOREIGN PATENT DOCUMENTS

CN  101269635 A  9/2008
JP  8-87395 A  4/1996
(Continued)

OTHER PUBLICATIONS

Japanese Office Action issued in Japanese Application No. 2008-300197 dated Mar. 21, 2012.
(Continued)

*Primary Examiner* — William C Vaughn, Jr.
*Assistant Examiner* — Luis M Perez
(74) *Attorney, Agent, or Firm* — Sughrue Mion, PLLC

(57) ABSTRACT

An input device, wherein the screen (18a) of a display device (18) is divided into two regions, a region (A1) and a region (A2), and the icon switch displayed in the region including the position of an invisible pointer (P') is selected. Thus, one of an icon switch (1) and an icon switch (2) that are displayed on the screen (18a) is selected at any time. Consequently, the user will no longer have to watch the screen carefully and perform an operation for moving an instruction marker such as a visible pointer to a desired icon switch, for example as in conventional devices. Accordingly, the user can enter a desired instruction in a short time by selecting a desired icon switch in a short time.

9 Claims, 6 Drawing Sheets

(51) Int. Cl.
*B60R 1/00* (2006.01)
*B60R 25/00* (2013.01)
*G06F 3/0481* (2013.01)

(56) References Cited

U.S. PATENT DOCUMENTS

| | | | |
|---|---|---|---|
| 6,919,866 B2* | 7/2005 | Kanevsky et al. | 345/8 |
| 7,567,861 B2* | 7/2009 | Inagaki | 701/1 |
| 7,818,691 B2* | 10/2010 | Irvine | 715/856 |
| 2006/0226298 A1* | 10/2006 | Pierson | 246/1 R |
| 2008/0231703 A1* | 9/2008 | Nagata et al. | 348/148 |
| 2010/0114438 A1 | 5/2010 | Makino et al. | |

FOREIGN PATENT DOCUMENTS

| | | |
|---|---|---|
| JP | 10-91320 A | 4/1998 |
| JP | 10-240445 A | 9/1998 |
| JP | 2004-252760 A | 9/2004 |
| JP | 2005-215749 A | 8/2005 |
| JP | 2006-215963 A | 8/2006 |
| JP | 2006-244393 A | 9/2006 |
| JP | 2007-179502 A | 7/2007 |
| JP | 2008-207727 A | 9/2008 |
| JP | 2008-257629 A | 10/2008 |

OTHER PUBLICATIONS

International Search Report of PCT/JP2009/069729 dated Jan. 12, 2010.

Extended European Search Report issued in European Application No. 09829045.5 dated Dec. 18, 2012.

Search Report of Chinese Office Action issued in Chinese Application No. 2009801472350 dated Feb. 20, 2013.

* cited by examiner

INPUT DEVICE, VEHICLE ENVIRONMENT MONITORING APPARATUS, ICON SWITCH SELECTION METHOD, AND RECORDING MEDIUM

CROSS REFERENCE TO RELATED APPLICATIONS

This application is a National Stage of International Application No. PCT/JP2009/069729, filed on Nov. 20, 2009, which claims priority from Japanese Patent Application No. 2008-300197, filed on Nov. 25, 2008, the contents of all of which are incorporated herein by reference in their entirety.

TECHNICAL FIELD

The present invention relates to an input device, a vehicle environment monitoring apparatus, an icon switch selection method, and recording medium. Particularly, the present invention relates to an input device for selecting an icon switch to enter a desired instruction, a vehicle environment monitoring apparatus comprising the input device, an icon switch selection method for selecting an icon switch displayed on a screen, and recording medium storing a program used with a controller controlling a display device displaying information.

BACKGROUND ART

A navigation device mounted on a vehicle such as an ordinary car or a vehicle environment monitoring apparatus monitoring the environment of a vehicle is operated generally by making a selection among multiple icon switches displayed on a screen via a remote operation device such as a remote controller or a touch panel.

In some of the above kind of devices, a remote operation device provided with a selection switch such as a joystick is used to place an instruction marker such as a pointer displayed on the screen on a desired icon switch so as to select the icon switch. To do so, the user has to watch the screen carefully for a certain amount of time while operating the device.

Then, recently, from the viewpoint of reducing the user workload, various methods for assisting the user operation in moving an instruction marker onto an icon switch to reduce the amount of time for which the user has to watch the screen carefully have been proposed (for example, Patent Literature 1 to 3).

PRIOR ART DOCUMENTS

Patent Literatures

Patent Literature 1: Unexamined Japanese Patent Application KOKAI Publication No. 2004-252760;
Patent Literature 2: Unexamined Japanese Patent Application KOKAI Publication No. H10-240445; and
Patent Literature 3: Unexamined Japanese Patent Application KOKAI Publication No. H8-87395.

DISCLOSURE OF INVENTION

Problem to be Solved by the Invention

The method described in the Patent Literature 1 makes the user operating the remote operation means feel a resistance force according to an icon switch corresponding to the position of the instruction marker when the user moves the instruction marker to a desired icon switch.

The method described in the Patent Literature 2 moves the instruction marker onto an icon switch when the instruction marker is located in a region including the icon switch on the screen. The method described in the Patent Literature 3 calculates the distance between each icon switch and the instruction marker on the screen and moves the instruction marker to the nearest icon switch.

However, in the above methods, when the user tries to position the instruction marker on any one of the icon switches on the screen, the user has to be aware of the position of the instruction marker even in the region between icon switches on the screen.

The present invention is invented in view of the above circumstances and a first exemplary object of the present invention is to provide an input device for easily entering a desired instruction in a short time.

A second exemplary object of the present invention is to provide an easily operable vehicle environment monitoring apparatus.

A third exemplary object of the present invention is to provide an icon switch selection method for easily selecting a desired icon switch in a short time.

A fourth exemplary object of the present invention is to provide a program to be executed by a controller controlling a display screen for easily selecting a desired icon switch in a short time.

Means for Solving the Problem

The input device according to a first exemplary aspect of the present invention is an input device for entering instructions into a given device, comprising a display unit defining an invisible pointer moving on a screen according to input from an external source and displaying multiple icon switches corresponding to the instructions and to which processing contents different from each other are assigned in multiple regions defined by dividing the screen on a one-by-one basis; a selection unit selecting the icon switch displayed in the region containing the position of the pointer, even if the position of the pointer is not moved to the icon switch provided that the position of the pointer is contained in one of the multiple regions; and an output unit outputting a signal indicating the icon switch selected by the selection unit.

The sizes of the regions may be defined according to the frequencies of use of the icon switches displayed. The icon switches may be displayed in parts of the regions.

The vehicle environment monitoring apparatus according to a second exemplary aspect of the present invention is a vehicle environment monitoring apparatus for monitoring vehicle environment, comprising the above input device and an imaging unit capturing images of the vehicle environment, wherein the display unit displays images captured by the imaging unit on the screen of the input device in a superimposed manner on the icon switches.

The icon switch selection method according to a third exemplary aspect of the present invention is an icon switch selection method for selecting one of multiple icon switches displayed on a screen, including the following steps: defining an invisible pointer moving on a screen according to input from an external source; displaying multiple icon switches to which processing contents different from each other are assigned in multiple regions defined by dividing the screen on a one-by-one basis; and selecting the icon switch displayed in the region containing the position of the pointer, even if the position of the pointer is not moved to the icon switch provided that the position of the pointer is contained in one of the multiple regions.

The icon switches may be displayed in parts of the regions.

The recording medium according to a fourth exemplary aspect of the present invention is a recording medium storing a program that allows a controller controlling a display device displaying information to execute the following procedures: defining an invisible pointer moving on a screen according to input from an external source; displaying multiple icon switches to which processing contents different from each other are assigned in multiple regions defined by dividing the screen on a one-by-one basis; and selecting the icon switch displayed in the region containing the position of the pointer, even if the position of the pointer is not moved to the icon switch provided that the position of the pointer is contained in one of the multiple regions.

The icon switches may be displayed in parts of the regions.

Effect of the Invention

A desired instruction can easily be entered in a short time. Furthermore, the amount of time for which the user has to carefully watch the screen on which multiple icon switches are displayed can be reduced.

BEST MODE FOR CARRYING OUT THE INVENTION

Figure 1:
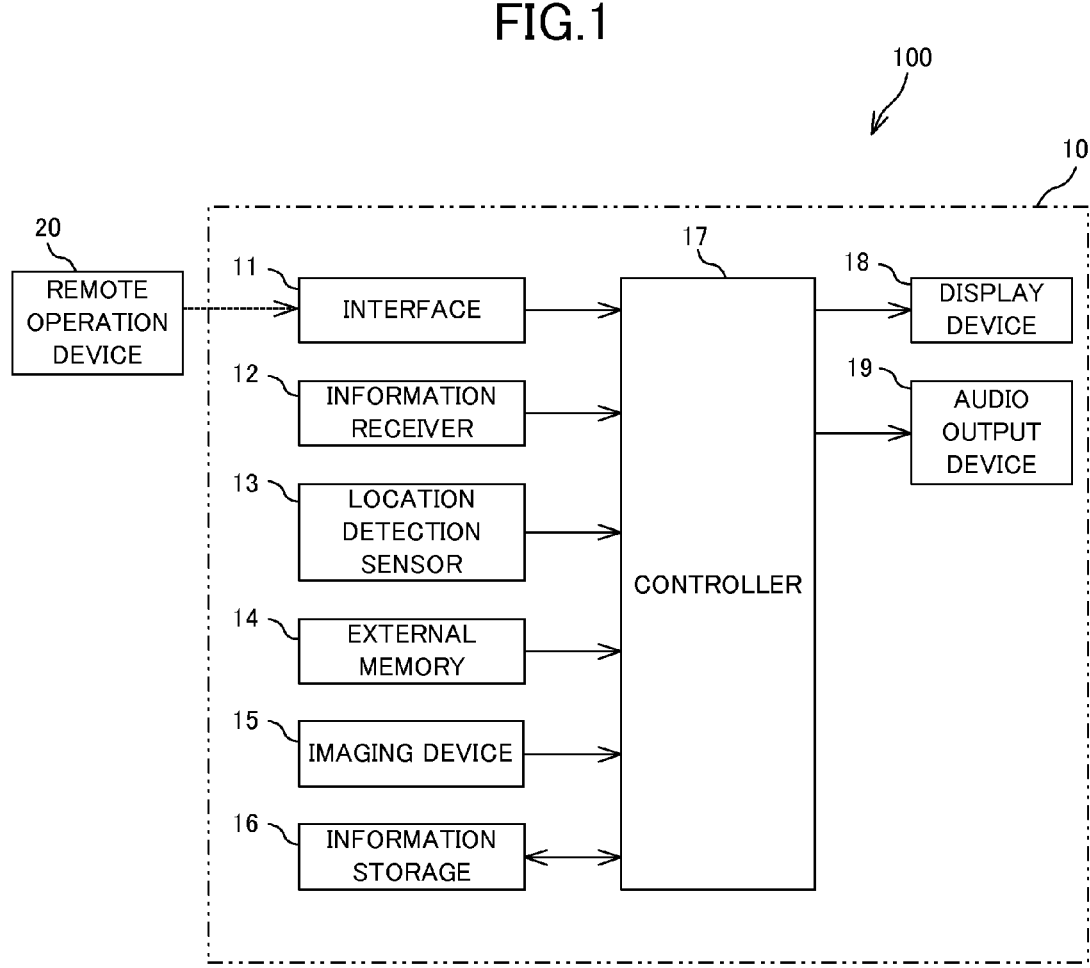
FIG. 1 A block diagram of a navigation device according to an embodiment of the present invention.

An embodiment of the present invention will be described hereafter with reference to FIGS. 1 to 5. A navigation device 100 is a device mounted on a vehicle such as an ordinary car. As shown in FIG. 1, the navigation device 100 according to this embodiment has a remote operation device 20 outputting infrared or other radio signals modulated in accordance with input from the user and a system body 10 operating based on the signals output from the remote operation device 20.

The system body 10 includes an interface 11, an information receiver 12, a location detection sensor 13, an external memory 14, an imaging device 15, an information storage 16, a controller 17, a display device 18, and an audio output device 19.

The interface 11 receives radio signals output from the remote operation device 20, converts the received radio signals to electric signals, and outputs them to the controller 17.

The information receiver 12 receives signals from satellites carrying the GPS (global positioning system) and outputs the current location information of a vehicle carrying the navigation device 100, the current time, and so on to the controller 17. Here, the information receiver 12 may include a VICS (vehicle information and communication system) information receiver obtaining traffic information using FM multiple broadcasting, radio beacon, or optical beacon, and/or a communication device capable of information communication with ATIS (advanced traffic information service) and other information centers and other vehicles via an information communication terminal such as a cell-phone.

The location detection sensor 13 includes various sensors such as earth magnetic sensors, gyro sensors, and vehicle speed sensors. The location detection sensor 13 detects the quantity of change in the position as the vehicle moves and outputs information including the detected quantity of change to the controller 17.

The external memory 14 is used to record information including map information, such as destination data and registered points data used for route search and route guidance. The external memory 14 can be, for example, an optical disc such as a CD (compact disc) and DVD (digital versatile disc), hard disc, or flash memory.

The imaging device 15 has, for example, a pair of cameras provided on the vehicle door mirrors or side mirrors and outputs image information captured by the cameras to the controller 17.

The information storage 16 is composed of, for example, a SDRAM (synchronous dynamic random access memory) or HDD (hard disc drive) and stores various programs for route search, route guidance, and vehicle environment monitoring with the use of the above-mentioned data stored in the external memory 14. Furthermore, the information storage 16 successively stores, for example, information containing operation contents entered by the user and history information such as information containing vehicle travel routes.

Figure 2:
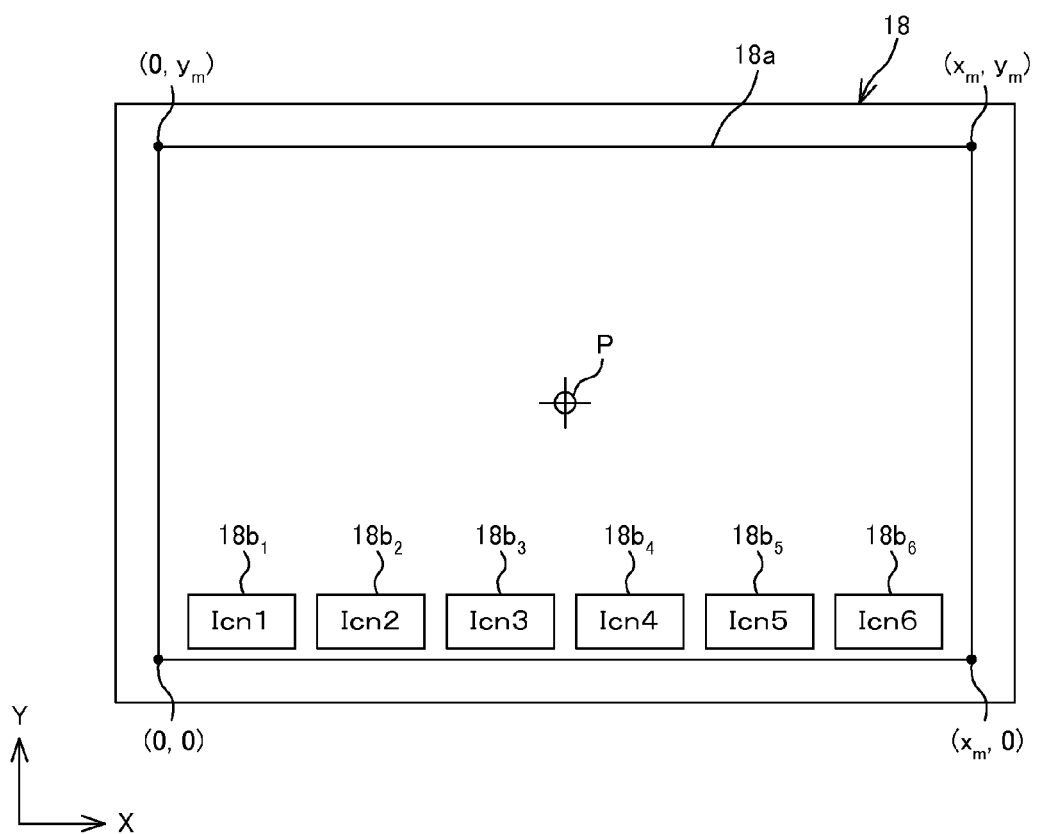
FIG. 2 A plane view of the display device.
Figure 3:
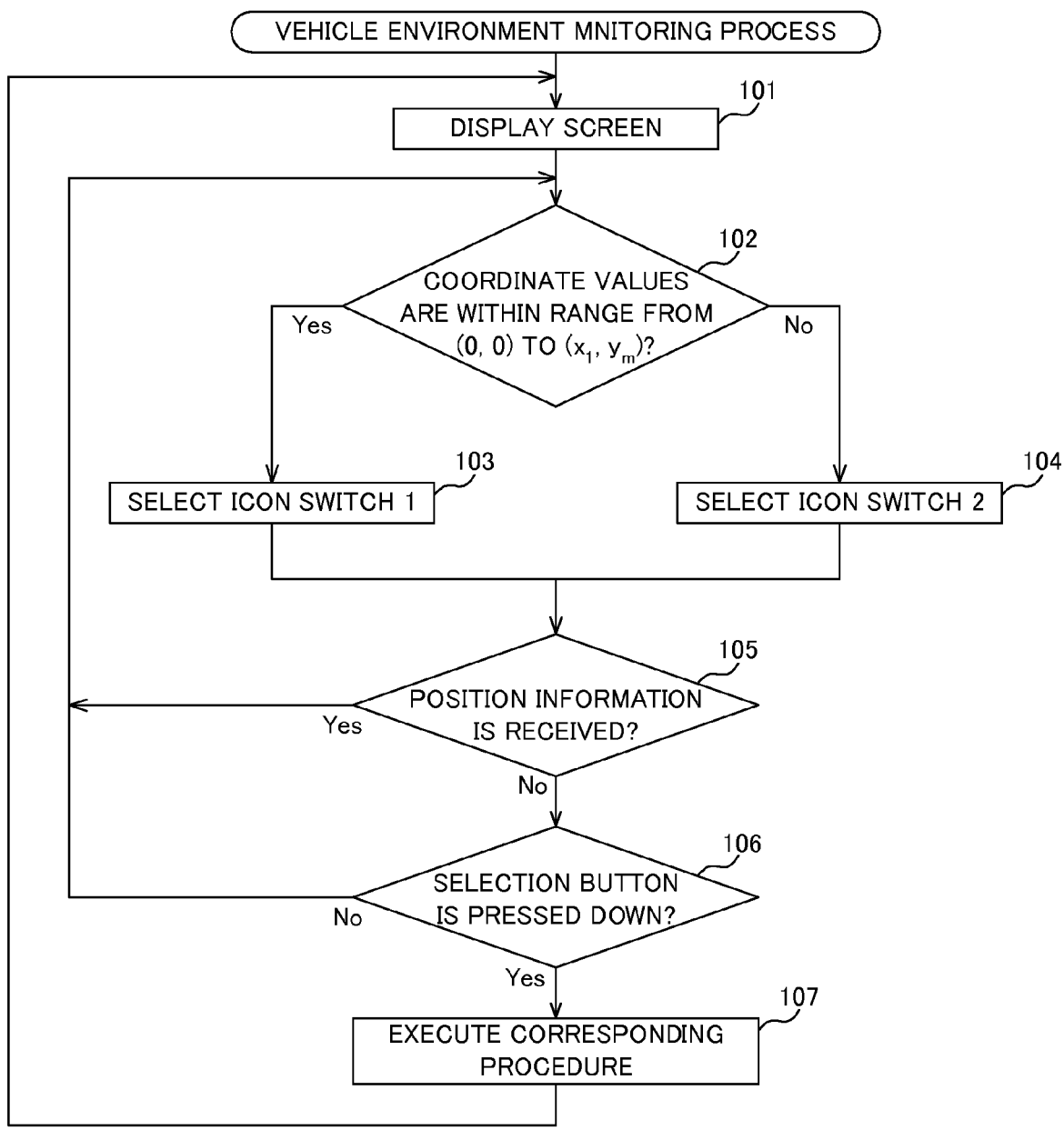
FIG. 3 A flowchart for explaining the vehicle environment monitoring procedure executed by the controller.

The display device 18 is composed of, for example, a liquid crystal display and displays information supplied from the controller 17. As shown in FIG. 2, the display device 18 has a rectangular screen 18a. For example, an X-Y coordinate system having the point of origin (0, 0) at the bottom left corner in FIG. 2 is defined on the screen 18a. A position on the screen is identified by the coordinate values ranging from the point of origin (0, 0) to the coordinates $(x_m, y_m)$ at the top right corner.

Returning to FIG. 1, the audio output device 19 is composed of a speaker or the like and produces audio output of information such as route guidance supplied from the controller 17.

The controller 17 is composed of a CPU (central processing unit) or the like. The controller 17 executes programs stored in the information storage 16 for route search and route guidance and outputs the results to the display device 18 and audio output device 19.

The remote operation device 20 comprises, for example, a joystick and multiple push buttons including a selection button. Operating the joystick provided to the remote operation device 20, the user can select a function of the navigation device 100 or enter a destination and search conditions into the controller 17 via the interface 11.

The operation method of the navigation device 100 having the above configuration will be described hereafter. When the navigation device 100 is activated, the controller 17 executes various programs stored in the information storage 16 and obtains the current location of the vehicle based on the location information supplied from the information receiver 12. Then, the controller 17 corrects the obtained current location based on, for example, information from the location detection sensor 13. The display device 18 displays the corrected current location along with map information on the screen 18a. Here, for example, multiple icon switches $18b_1$ to $18b_6$ including an icon switch $18b_1$ for monitoring the vehicle environment and a pointer P for making a selection among the multiple icon switches $18b_1$ to $18b_6$ are displayed on the screen 18a of the display device 18. The icon switches 18b₁ to 18b₆ and pointer P are displayed on the screen 18a of the display device 18 under the control of the controller 17.

Here, in order for the user to monitor the vehicle environment using the imaging device 15, he/she operates the joystick of the remote operation device 20 to move the pointer P and place it on the icon switch $18b_1$. The icon switch $18b_1$ is an icon for starting monitoring the vehicle environment. Then, in this state, he/she presses down the selection button of the remote operation device 20. In response to that, the controller 17 executes programs shown in the flowchart in FIG. 3 to start monitoring the vehicle environment.

Figure 4:
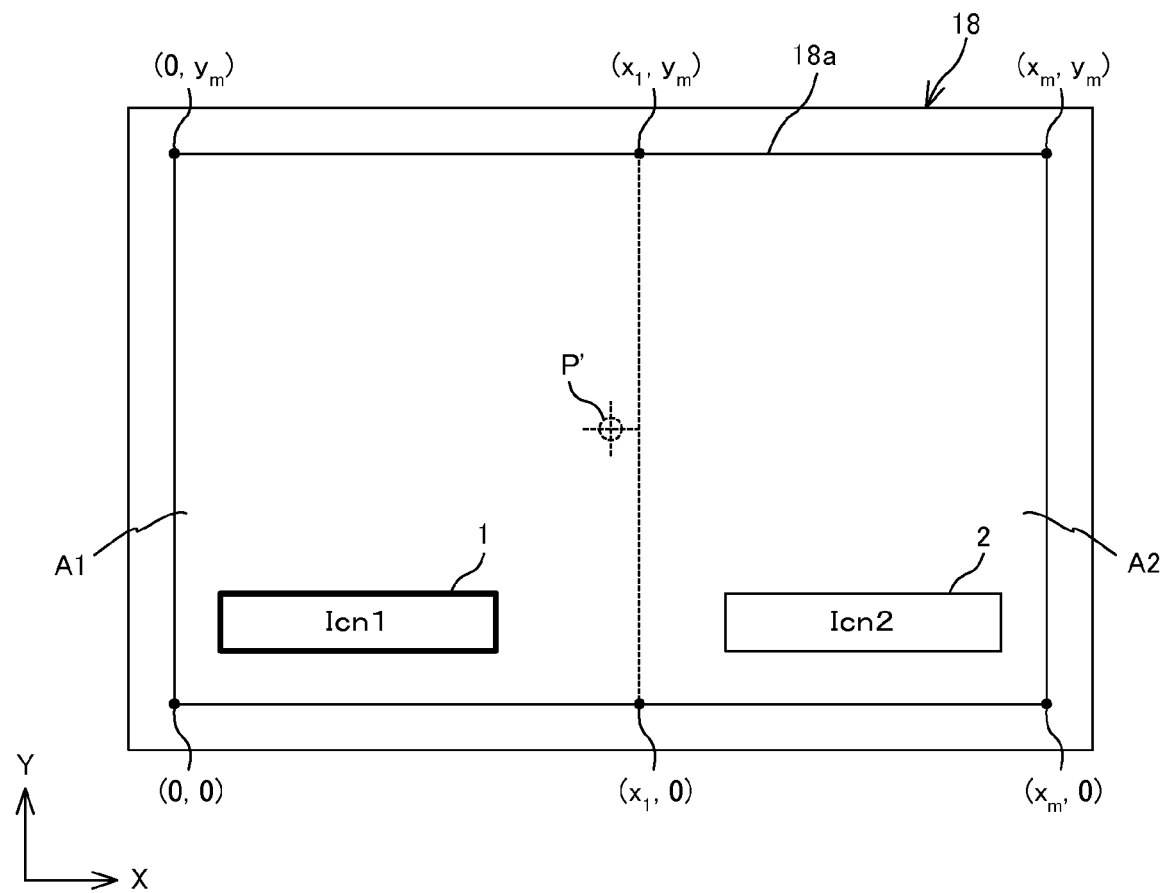
FIG. 4 An illustration showing a screen displayed while the imaging device is operated.

First, in the first Step 101, the controller 17 displays an initial screen as shown in FIG. 4 on the screen 18a of the display device 18. As shown in FIG. 4, the initial screen is composed of a vehicle environment image captured by the imaging device 15, an icon switch 1, and an icon switch 2. As shown in FIG. 4, when the initial screen is displayed, two regions, a region A1 and a region A2, are defined on the screen 18a. The icon switches 1 and 2 are displayed in the regions A1 and A2, respectively.

In this embodiment, there is no visible borderline to divide the screen into the regions A1 and A2. For example, the controller 17 defines the region A1 as a rectangular region ranging from the point of origin (0, 0) to the coordinates ($x_1$, $y_m$) and the region A2 as a rectangular region ranging from the coordinates ($x_1$+1, 0), which has the X-coordinate value greater than the coordinates ($x_1$, $y_m$) by 1 unit, to the coordinates ($x_m$, $y_m$), whereby the entire range of the screen is assigned to one of the regions (the regions A1 and A2 in this case).

In this state, the controller 17 defines an invisible virtual pointer P' (the virtual pointer P' hereafter) at any position on the screen, for example, at the center of the screen. The virtual pointer P' is invisible to the user; however, it moves on the screen according to position information output from the remote operation device 20.

In the next Step 102, the controller 17 detects the coordinates (x, y) of the position of the virtual pointer P' defined on the screen 18a of the display device 18 and determines whether the position coordinates (x, y) are in the range from (0, 0) to ($x_1$, $y_m$), in other words whether the position coordinates of the pointer P' are in the region A1. The controller 17 proceeds to Step 103 if the determination turns out to be affirmative while it proceeds to Step 104 if the determination turns out to be negative.

In Step 103, the controller 17 selects the icon switch 1 displayed in the region A1. On the other hand, in Step 104, the controller 17 selects the icon switch 2 displayed in the region A2. In the navigation device 100 of this embodiment, the selected icon switch is displayed in a color different from the display color before the selection or highlighted with thick outline so that it is immediately obvious. In this way, the user can easily identify the selected icon switch.

In the next Step 105, the controller 17 determines whether position information is received from the remote operation device 20. The position information contains information on the coordinates (x, y) identifying a position on the screen. With the user operating the joystick provided to the remote operation device 20, the position information is output from the remote operation device 20. For easier understanding, the coordinates information output from the remote operation device 20 and received by the controller 17 is termed the received coordinates (x, y) hereafter. If the determination turns out to be affirmative in Step 105, in other words if the position information containing the received coordinates (x, y) is received, the controller 17 moves the virtual pointer P' to the position on the screen corresponding to the received coordinates (x, y) and returns to Step 102. The procedures of Steps 102 to 105 are repeated until the determination turns out to be negative in Step 105.

On the other hand, if the determination turns out to be negative in Step 105, the controller 17 proceeds to the next Step 106.

In Step 106, the controller 17 determines whether the selection button provided to the remote operation device 20 is pressed down. This determination is made, for example, by determining whether a given signal output from the remote operation device 20 is received.

If the determination turns out to be negative in Step 106, the controller 17 returns to Step 102 and repeats a series of procedures of Steps 102 to 106 until the determination turns out to be affirmative in Step 106. In this way, with the user operating the joystick, the virtual pointer P' moves, for example, from the region A1 to the region A2 along an arrow Ya shown in FIG. 5. Then, as the virtual pointer P' moves, the icon switch 1 displayed in the region A1 having contained the virtual pointer P' is deselected and the icon switch 2 displayed in the region A2 containing the moved virtual pointer P' is newly selected. On the other hand, in the case wherein the virtual pointer P' moves from the region A2 to the region A1, the icon switch 2 displayed in the region A2 having contained the virtual pointer P' is deselected and the icon switch 1 displayed in the region A1 containing the moved virtual pointer P' is newly selected as the virtual pointer P' moves.

On the other hand, if the determination turns out to be affirmative in Step 106, the controller 17 shifts to the next Step 107.

In step 107, the controller 17 outputs to the display device 18 a signal indicating the icon switch that is selected when the selection button of the remote operation device 20 is pressed down and starts a procedure corresponding to the icon switch. Then, after completing the procedure, the controller 17 returns to Step 101.

In the subsequent processing, screens corresponding to the procedure in Step 107 are displayed on the screen 18a of the display 18. Then, operating the remote operation device 20, the user selects an icon switch corresponding to each process and displayed on the screen 18a as appropriate so as to execute various operations of the imaging device 15, whereby he/she can view images captured by the imaging device 15 on the screen 18a.

In order to discontinue the operation of the imaging device 15, an icon switch assigned to discontinuation of the operation of imaging device 15 is displayed on the screen 18a of the display device 18 so that the user can select that icon switch.

As described above, in this embodiment, the screen 18a of the display device 18 is divided into two regions A1 and A2 and the icon switch displayed in the region containing the virtual pointer P' is selected. In this way, either the icon switch 1 or the icon switch 2 displayed on the screen 18a is selected at any time. Then, for example unlike in conventional devices, the user does not have to watch the screen carefully and perform an operation for moving an instruction marker such as a visible pointer to a desired icon switch. Therefore, the user can easily select a desired icon switch in a short time. Furthermore, in this way, the user can enter a desired instruction without watching the screen carefully for a large amount of time. Therefore, the workload of the user can be reduced.

Furthermore, in this embodiment, no visible instruction marker such as a pointer is displayed on the screen 18a of the display device 18 while the imaging device 15 is operated. The visibility of an image captured by the imaging device 15 and displayed on the screen 18a is not obstructed, whereby the visibility of a display object displayed on the screen is improved. Furthermore, the system body 10 is operated based on the virtual pointer even while the vehicle environment is monitored. In this way, the user can monitor the vehicle environment without any strange feeling and with the same operability as navigation in which a visible pointer is used for operating the device.

In this embodiment, the remote operation device 20 outputs information including the coordinates (x, y) of the virtual pointer P'. However, the remote operation device 20 is not restricted thereto and can be configured to output signals including information for increasing/decreasing the coordinates of the current position of the virtual pointer P'. In such a case, with the X-coordinate value and Y-coordinate value of the virtual pointer P' being increased/decreased, the virtual pointer P' successively moves on the screen 18a of the display device 18 in accordance with instructions from the user. Then, the icon switch in the region containing the position of the virtual pointer P' is selected in sequence.

Furthermore, the remote operation device 20 of this embodiment comprises a joystick and a selection button. However, the remote operation device 20 is not restricted thereto and can comprise a jog dial, direction keys, a cross-shaped button, and so on in place of a joystick. What matters is that the remote operation device 20 is configured to have the capability of outputting the position information of the virtual pointer P' or increasing/decreasing the coordinates of the position of the virtual pointer P'.

Furthermore, in this embodiment, the remote operation device 20 and system body 10 communicate by means of wireless signals (for example, infrared light). However, the remote operation device 20 and system body 10 are not restricted thereto and can electrically be connected by a cable and communicate via the cable. This is a kind of wired remote controller excluding touch panel type operation devices.

Figure 5:
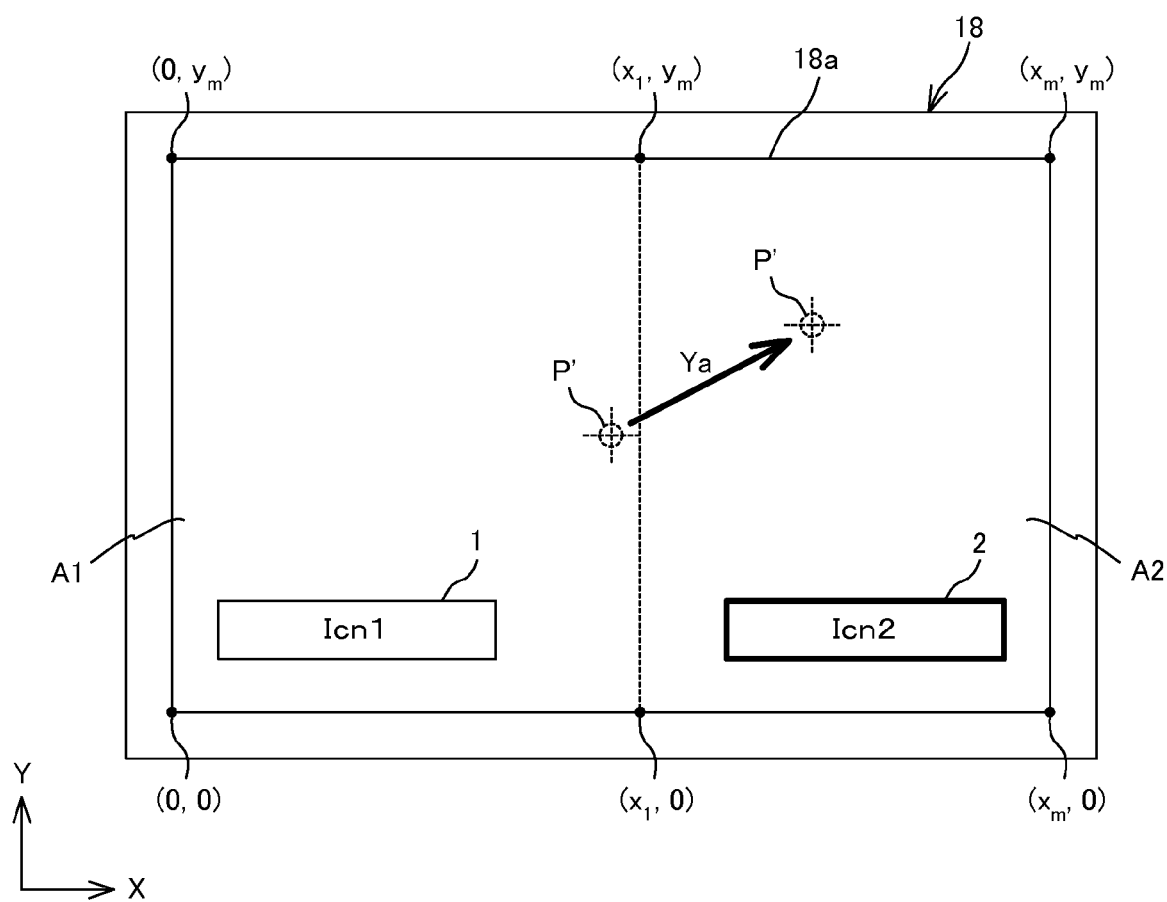
FIG. 5 An illustration for explaining the icon switch selection method.
Figure 6:
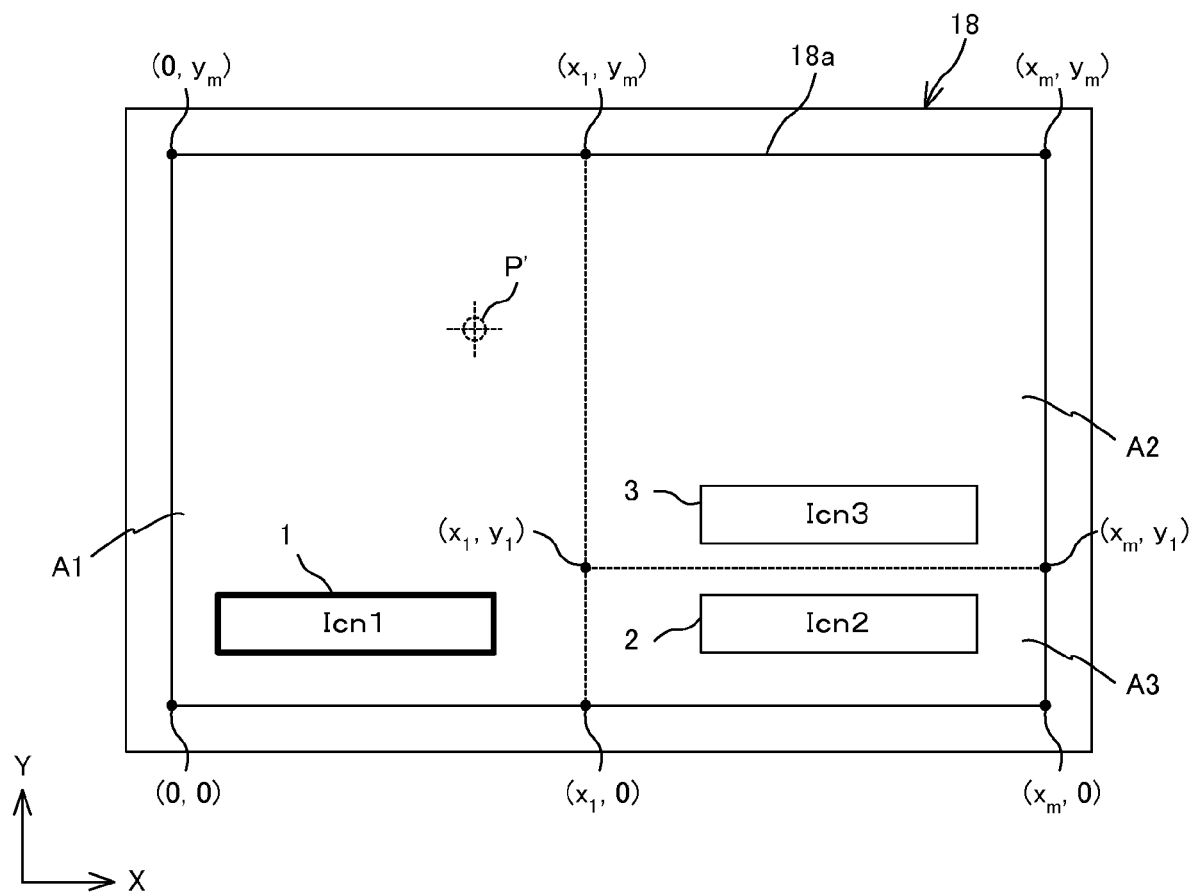
FIG. 6 An illustration showing a modified embodiment of a screen displayed while the imaging device is operated.

Furthermore, in this embodiment, the screen 18a of the display device 18 is divided into two regions so that two regions are defined on the screen 18a as shown in FIG. 5. However, as shown in FIG. 6, it is possible to divide the screen 18a into three or more regions and display icon switches 1 to 3 in the respective regions. Also in such a case, the icon switch displayed in the region containing the position of the virtual pointer P' is selected at any time; the user can easily select a desired icon switch and, consequently, the amount of time for which the user watches the screen carefully can be reduced.

Furthermore, the size of a region in which an icon switch is displayed can be determined according to the frequency of use and/or importance of the displayed icon switch. In this way, a frequently used icon switch is more easily selected, further reducing the operation load of the user. In such a case, for example, the controller 17 takes the statistics of frequency of use of icon switches, stores them in the information storage 16, and changes the sizes of icon switches based on the statistics. For example, if two icon switches are used with a frequency ratio of 7:3, the controller 17 creates the regions in which the two icons are displayed with a size ratio of 7:3.

Furthermore, a resistance force can be applied to the joystick of the operation device when a different icon switch is selected. In this way, the user can easily recognize that a different icon switch is selected, whereby the user can select a desired icon switch with higher accuracy. Here, a technique for applying a resistance force to the joystick of the remote operation device 20 is described in detail, for example, in Patent Literature 1 (Unexamined Japanese Patent Application KOKAI Publication No. 2004-252760). More specifically, when the virtual pointer P' has moved from a region to which the currently selected icon switch belongs to another region in which a desired icon switch is displayed, a force (resistance force) to return the joystick of the remote operation device 20 tilted by the user to the neutral position is applied. In this way, operating the joystick according to the resistance force, the user can easily move the virtual pointer to the region containing a desired icon switch and simply select the desired icon switch. Alternatively, the user can continue to tilt the joystick against the resistance force so as to move the virtual pointer to another region.

Furthermore, in this embodiment, the virtual pointer P' is used. However, it is possible that no virtual pointer is defined and the controller determines the coordinates of a position at which an intrinsically visible pointer is displayed and selects the icon switch in the region containing the position on the screen corresponding to the recognized coordinate values.

Furthermore, the icon switch selection method and input device described in this embodiment are suitable not only for vehicle environment monitoring apparatuses but also for environment monitoring apparatuses used with other mobile means. Furthermore, besides environment monitoring apparatuses, they are also suitable for selection of icon switches displayed on a rear monitor and an in-vehicle camera display screen.

In some cases, the icon switch selection method and input device according to the present invention can be used for selecting an icon switch displayed on screens in the course of vehicle navigation, such as a screen for entering a destination and other conditions for route search and a screen displaying a map and the current location for route guidance. Also in such cases, the user can easily select a desired icon switch and, consequently, the amount of time for which the user watches the screen carefully can be reduced. Furthermore, deterioration in the visibility of a screen due to an instruction marker such as an icon displayed on the screen can be avoided.

The present application is based on Japanese Patent Application No. 2008-300197 filed on Nov. 25, 2008, of which the specification, scope of claims, and drawings are entirely incorporated herein by reference.

INDUSTRIAL APPLICABILITY

The input device according to the present invention is suitable for various input devices.

DESCRIPTION OF REFERENCE NUMERALS

1 to 3 . . . icon switch
10 . . . system body
11 . . . interface
12 . . . information receiver
13 . . . location detection sensor
14 . . . external memory
15 . . . imaging device (imaging unit)
16 . . . information storage
17 . . . controller (selection unit, processing unit, control unit)
18 . . . display device (display unit)
18a . . . screen
18b . . . icon switch
19 . . . audio output device
20 . . . remote operation device
100 . . . navigation device
A1, A2 . . . region
P . . . pointer
P' . . . virtual pointer

The invention claimed is:

1. An input device for entering instructions into a given device, comprising:
a display unit defining
an invisible pointer invisible to a user and
moving to a virtual position corresponding to coordinates on a screen according to input from an external source, and
displaying multiple icon switches corresponding to the instructions and to which processing contents different from each other are assigned in respective multiple regions defined by dividing the screen on a one-by-one basis,
the multiple regions contacting one another, and the entire range of the screen being allocated to the multiple regions; and
a computer processor for performing the following operations;
selecting the icon switch displayed in one the region of the multiple regions containing the virtual position of the invisible pointer,
based on a determination that the virtual position is within the one region of the multiple regions, even if the position of the pointer is not moved to the icon switch,
the selection of the icon switch is based only on the virtual position of the virtual pointer; and
outputting a signal to start a processing corresponding to indicating the selected icon switch upon confirmation of a selection of the selected icon switch by the user, even if the position of the pointer is not moved to the icon switch;
wherein the display unit displays images of a vehicle environment captured by a camera on the screen of the input device in a superimposed manner on the icon switches.

2. The input device according to claim 1, wherein the sizes of the regions are modified defined according to the frequencies of use of the icon switches displayed.

3. The input device according to claim 1, wherein the icon switches are displayed in parts of the regions.

4. An icon switch selection method for selecting one of multiple icon switches displayed on a screen, including the following steps:
defining an invisible pointer invisible to a user and moving to a virtual position corresponding to coordinates on a screen according to input from an external source;
displaying multiple icon switches to which processing contents different from each other are assigned in respective multiple regions defined by dividing the screen on a one-by-one basis,
the multiple regions contacting one another, and the entire range of the screen being allocated to the multiple regions;
an selecting the icon switch displayed in one the region of the multiple regions containing the virtual position of the pointer based on a determination that the virtual position is within the one region of the multiple regions, even if the position of the pointer is not moved to the icon switch, the selection of the icon switch is based only on the virtual position of the invisible pointer; and
starting a processing corresponding to the selected icon switch upon confirmation of a selection of the selected icon switch by the user, even if the position of the pointer is not moved to the icon switch
wherein the display unit displays images of a vehicle environment captured by a camera on the screen of the input device in a superimposed manner on the icon switches.

5. The icon switch selection method according to claim 4, wherein the icon switches are displayed in parts of the regions.

6. A non-transitory computer readable recording medium storing a program that allows a controller controlling a display device displaying information to execute the following procedures:
defining an invisible pointer invisible to a user and moving to a virtual position corresponding to coordinates on a screen according to input from an external source;
displaying multiple icon switches to which processing contents different from each other are assigned in respective multiple regions defined by dividing the screen on a one-by-one basis,
the multiple regions contacting one another, and the entire range of the screen being allocated to the multiple regions;
an selecting the icon switch displayed in one region of the multiple regions containing the virtual position of the pointer based on a determination that the virtual position is within the one region of the multiple regions, even if the position of the pointer is not moved to the icon switch;
the selection of the icon switch is based only on the virtual position of the invisible pointer; and
starting a processing corresponding to the selected icon switch upon confirmation of a selection of the selected icon switch by the user, even if the position of the pointer is not moved to the icon switch;
wherein the display unit displays images of a vehicle environment captured by a camera on the screen of the input device in a superimposed manner on the icon switches.

7. The recording medium according to claim 6, wherein the icon switches are displayed in parts of the regions.

8. The icon switch selection method according to claim 4, wherein the sizes of the regions are modified according to the frequencies of use of the icon switches displayed.

9. The recording medium according to claim 4, wherein the sizes of the regions are modified according to the frequencies of use of the icon switches displayed.

* * * * *